United States Patent
Guo et al.

(10) Patent No.: US 11,886,503 B2
(45) Date of Patent: *Jan. 30, 2024

(54) METHOD AND APPARATUS FOR IMPLEMENTING A SEARCH INDEX GENERATOR

(71) Applicant: GROUPON, INC., Chicago, IL (US)

(72) Inventors: Jiaqi Guo, Chicago, IL (US); Sri Subramanian, Cupertino, CA (US); Ram Gopalan, Chennai (IN)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,504

(22) Filed: Jun. 6, 2022

(65) Prior Publication Data

US 2022/0382810 A1 Dec. 1, 2022

Related U.S. Application Data

(63) Continuation of application No. 16/845,869, filed on Apr. 10, 2020, now Pat. No. 11,379,523, which is a
(Continued)

(51) Int. Cl.
*G06F 16/901* (2019.01)
*G06F 16/903* (2019.01)

(52) U.S. Cl.
CPC ...... *G06F 16/901* (2019.01); *G06F 16/90335* (2019.01)

(58) Field of Classification Search
CPC ........... G06F 16/90335; G06F 11/3438; G06F 16/951
(Continued)

(56) References Cited

U.S. PATENT DOCUMENTS 6,012,087 A * 1/2000 Freivald ................ G06F 16/957
709/218
6,219,818 B1 4/2001 Freivald et al.
(Continued)

OTHER PUBLICATIONS

U.S. Appl. No. 16/845,869, filed Apr. 10, 2020, U.S. Pat. No. 11,379,523, Issued.
(Continued)

*Primary Examiner* — Hung T Vy
(74) *Attorney, Agent, or Firm* — Alston & Bird LLP

(57) ABSTRACT

The disclosure provides examples of methods, apparatuses, systems, and computer program products for implementing a search indexer. One example method includes receiving, by index workflow circuitry, a search index update indicator, causing, by the index workflow circuitry and in response to receiving the search index update indicator, index generation circuitry to retrieve data sets from a plurality of data sources, calculating a checksum for each of the data sets, comparing the checksum for each of the data sets to a set of search index metadata, in response to determining that at least one checksum for at least one of the data sets does not match a metadata checksum from the set of search index metadata, generating a set of search index data from the data set corresponding to the at least one checksum, generating a search index using at least the set of search index data, and transmitting the search index to a search service for use in responding to at least one search query.

20 Claims, 7 Drawing Sheets

Related U.S. Application Data continuation of application No. 14/588,196, filed on Dec. 31, 2014, now Pat. No. 10,657,177.

(58) Field of Classification Search
USPC .................................................. 707/696, 687
See application file for complete search history.

(56) References Cited

U.S. PATENT DOCUMENTS

| | | | |
|---|---|---|---|
| 7,181,438 B1 | 2/2007 | Szabo | |
| 7,308,643 B1 | 12/2007 | Zhu et al. | |
| 8,423,885 B1 | 4/2013 | Kupke et al. | |
| 8,635,202 B2 | 1/2014 | Wen et al. | |
| 9,342,524 B1 | 5/2016 | Doty | |
| 9,411,862 B1 | 8/2016 | Wang et al. | |
| 10,657,177 B1 * | 5/2020 | Guo | G06F 16/90335 |
| 2004/0003132 A1 | 1/2004 | Stanley et al. | |
| 2004/0249801 A1 * | 12/2004 | Kapur | G06F 16/951 |
| 2009/0234809 A1 | 9/2009 | Bluger et al. | |
| 2009/0299962 A1 | 12/2009 | Permandla et al. | |
| 2013/0091197 A1 | 4/2013 | Bar-Zeev et al. | |
| 2013/0304615 A1 * | 11/2013 | Gold | G09B 19/18 |
| | | | 705/30 |

OTHER PUBLICATIONS

U.S. Appl. No. 14/588,196, filed Dec. 31, 2014, U.S. Pat. No. 10,657,177, Issued.

* cited by examiner

METHOD AND APPARATUS FOR IMPLEMENTING A SEARCH INDEX GENERATOR

CROSS-REFERENCE TO RELATED APPLICATIONS

This application is a continuation of and claims priority to U.S. patent application Ser. No. 16/845,869, filed Apr. 10, 2020, entitled "METHOD AND APPARATUS FOR IMPLEMENTING A SEARCH INDEX GENERATOR," which is a continuation of and claims priority to U.S. patent application Ser. No. 14/588,196, filed Dec. 31, 2014, entitled "METHOD AND APPARATUS FOR IMPLEMENTING A SEARCH INDEX GENERATOR," the contents of each of which are hereby incorporated herein by reference in their entirety.

TECHNOLOGICAL FIELD

Example embodiments of the present invention relate generally to search technology and, more particularly, to methods, systems, and apparatuses for implementing a search index generator.

BACKGROUND

The applicant has discovered problems with current methods, systems, and apparatuses for indexing data for use by search engines. Through applied effort, ingenuity, and innovation, Applicant has solved many of these identified problems by developing a solution that is embodied by the present invention, which is described in

BRIEF SUMMARY

Accordingly, methods, apparatuses, and computer program products as described herein provide for a search index generator. Example embodiments may include a method for generating a search index. The method includes receiving, by index workflow circuitry, a search index update indicator, causing, by the index workflow circuitry and in response to receiving the search index update indicator, index generation circuitry to retrieve data sets from a plurality of data sources, calculating a checksum for each of the data sets, comparing the checksum for each of the data sets to a set of search index metadata, in response to determining that at least one checksum for at least one of the data sets does not match a metadata checksum from the set of search index metadata, generating a set of search index data from the data set corresponding to the at least one checksum, generating a search index using at least the set of search index data, and transmitting the search index to a search service for use in responding to at least one search query. In some embodiments the method includes receiving a set of search results from the search service, determining a set of content corresponding to the set of search results, and providing the set of content to at least one consumer. At least two of the data sets may be located at different data centers. The search index may include a set of JavaScript Object Notation pair values. The pair values may include a search term and a content identifier. The search index update indicator may be a new data set registering with the index workflow circuitry. The search index update indicator may be a periodic indicator. The method may include excluding a data set in response to determining that the at least one checksum matches at least one metadata checksum. The method may include splitting the at least one data set into multiple shards. Each of the multiple shards may be processed concurrently. Each of the multiple shards may be processed as a separate MapReduce job. Generating the search index may include at least one MapReduce job.

Embodiments also include a non-transitory computer readable storage medium comprising instructions that, when executed by a processor, configure an apparatus to generate a search index. The instructions include program instructions for receiving a search index update indicator, program instructions for causing, in response to receiving the search index update indicator, index generation circuitry to retrieve data sets from a plurality of data sources, program instructions for calculating a checksum for each of the data sets, program instructions for comparing the checksum for each of the data sets to a set of search index metadata, program instructions for, in response to determining that at least one checksum for at least one of the data sets does not match a metadata checksum from the set of search index metadata, generating a set of search index data from the data set corresponding to the at least one checksum, program instructions for generating a search index using at least the set of search index data, and program instructions for transmitting the search index to a search service for use in responding to at least one search query.

The instructions may also include program instructions for receiving a set of search results from the search service, program instructions for determining a set of content corresponding to the set of search results, and program instructions for providing the set of content to at least one consumer. At least two of the data sets may be located at different data centers. The search index may include a set of JavaScript Object Notation pair values. The pair values may include a search term and a content identifier. The search index update indicator may be a new data set registering with the index workflow circuitry. The search index update indicator may be a periodic indicator. The instructions may include program instructions for excluding a data set in response to determining that the at least one checksum matches at least one metadata checksum.

The instructions may further include program instructions for splitting the at least one data set into multiple shards. Each of the multiple shards may be processed concurrently. Each of the multiple shards may be processed as a separate MapReduce job. Generating the search index may include at least one MapReduce job.

Embodiments also include an apparatus for generating a search index. The apparatus includes means for receiving a search index update indicator, means for causing, in response to receiving the search index update indicator, index generation circuitry to retrieve data sets from a plurality of data sources, means for calculating a checksum for each of the data sets, means for comparing the checksum for each of the data sets to a set of search index metadata, means for, in response to determining that at least one checksum for at least one of the data sets does not match a metadata checksum from the set of search index metadata, generating a set of search index data from the data set corresponding to the at least one checksum, means for generating a search index using at least the set of search index data, and means for transmitting the search index to a search service for use in responding to at least one search query. The apparatus may also include means for receiving a set of search results from the search service, means for determining a set of content corresponding to the set of search results, and means for providing the set of content to at least one consumer. At least two of the data sets may be located at different data centers. The search index may include a set of JavaScript Object Notation pair values. The pair values may include a search term and a content identifier.

The search index update indicator may be a new data set registering with the index workflow circuitry. The search index update indicator may be a periodic indicator. The apparatus may include means for excluding a data set in response to determining that the at least one checksum matches at least one metadata checksum. The apparatus may further include means for splitting the at least one data set into multiple shards. Each of the multiple shards may be processed concurrently. Each of the multiple shards may be processed as a separate MapReduce job. Generating the search index may include at least one MapReduce job.

Embodiments also include an apparatus for generating a search index. The apparatus includes index workflow circuitry configured to receive a search index update indicator, cause, in response to receiving the search index update indicator, index generation circuitry to retrieve data sets from a plurality of data sources, calculate a checksum for each of the data sets, compare the checksum for each of the data sets to a set of search index metadata, and transmit a search index to a search service for use in responding to at least one search query. The apparatus also includes index generation circuitry configured to, in response to determining that at least one checksum for at least one of the data sets does not match a metadata checksum from the set of search index metadata, generate a set of search index data from the data set corresponding to the at least one checksum, and generate the search index using at least the set of search index data. The apparatus also includes communications circuitry configured to receive a set of search results from the search service, and provide the set of content to at least one consumer, and a processor configured to determine a set of content corresponding to the set of search result. At least two of the data sets may be located at different data centers. The search index may include a set of JavaScript Object Notation pair values. The pair values may include a search term and a content identifier. The search index update indicator may be a new data set registering with the index workflow circuitry. The search index update indicator may be a periodic indicator. The index workflow circuitry may be further configured to exclude a data set in response to determining that the at least one checksum matches at least one metadata checksum. At least one of the index generation circuitry or the index workflow circuitry may be further configured to split the at least one data set into multiple shards. Each of the multiple shards may be processed concurrently. Each of the multiple shards may be processed as a separate MapReduce job. Generating the search index may include at least one MapReduce job.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
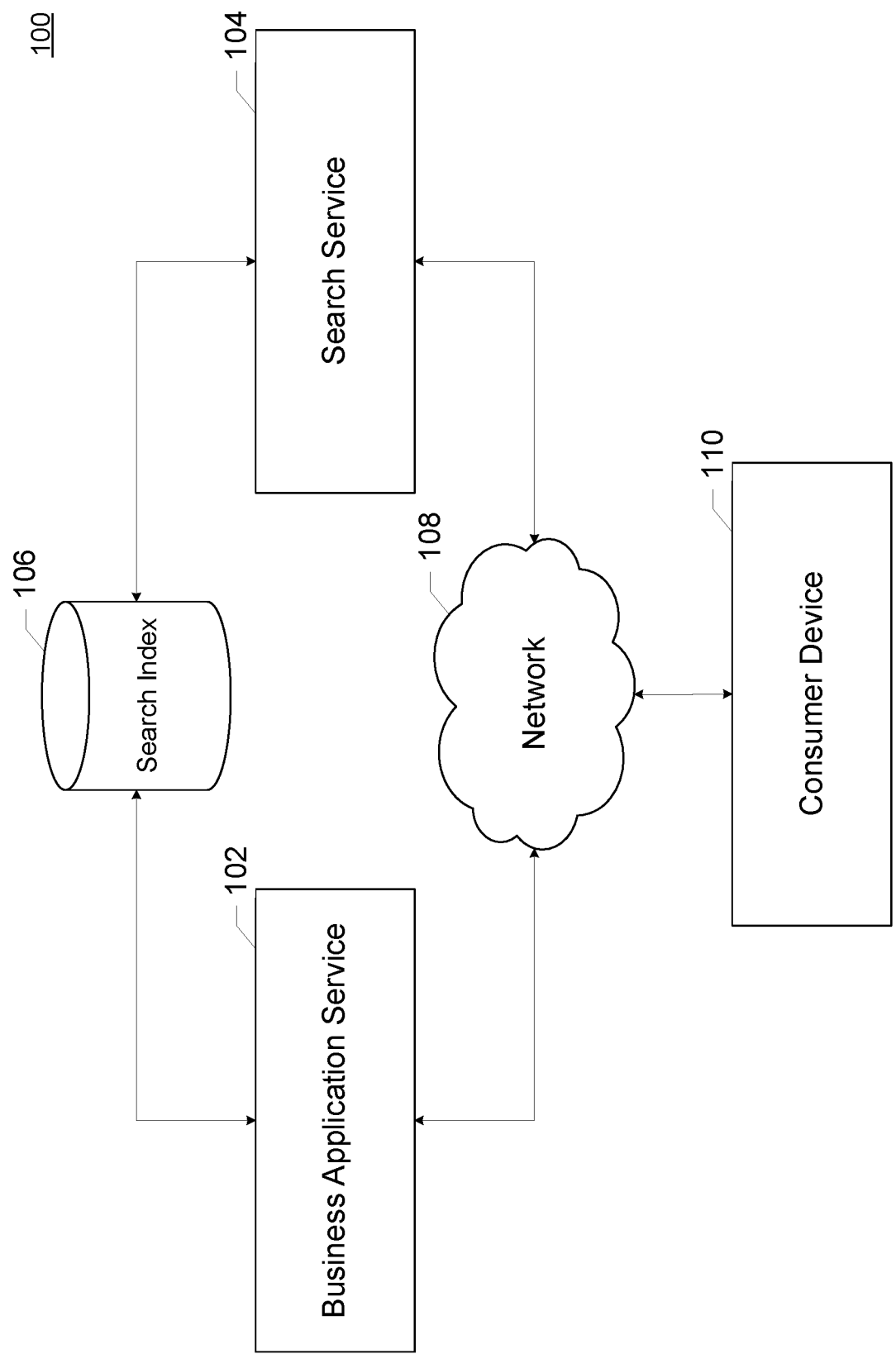
Figure 2:
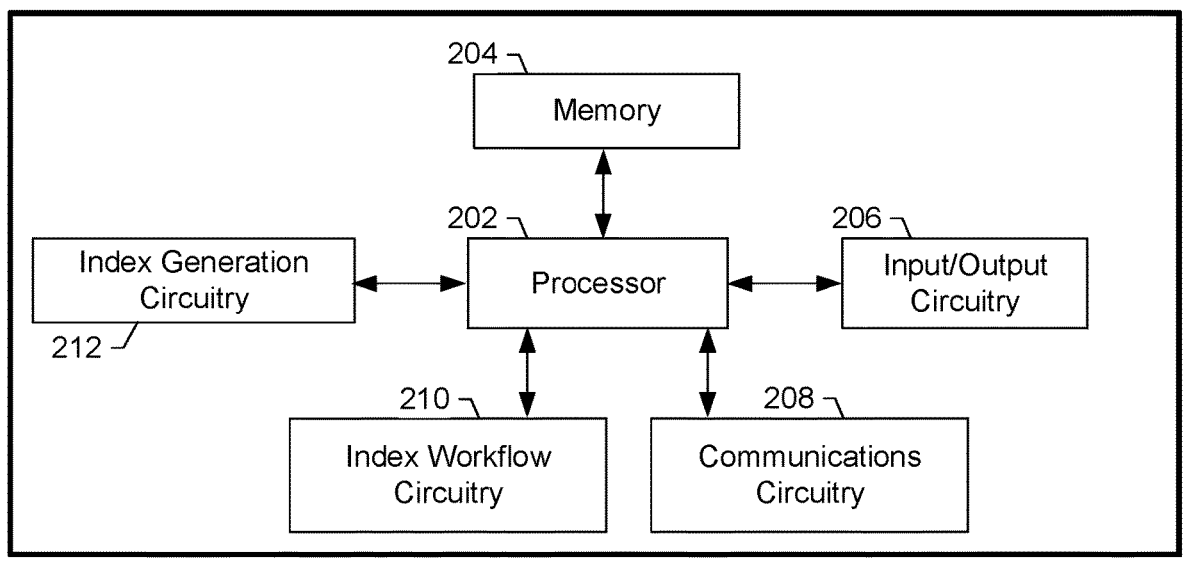
Figure 3:
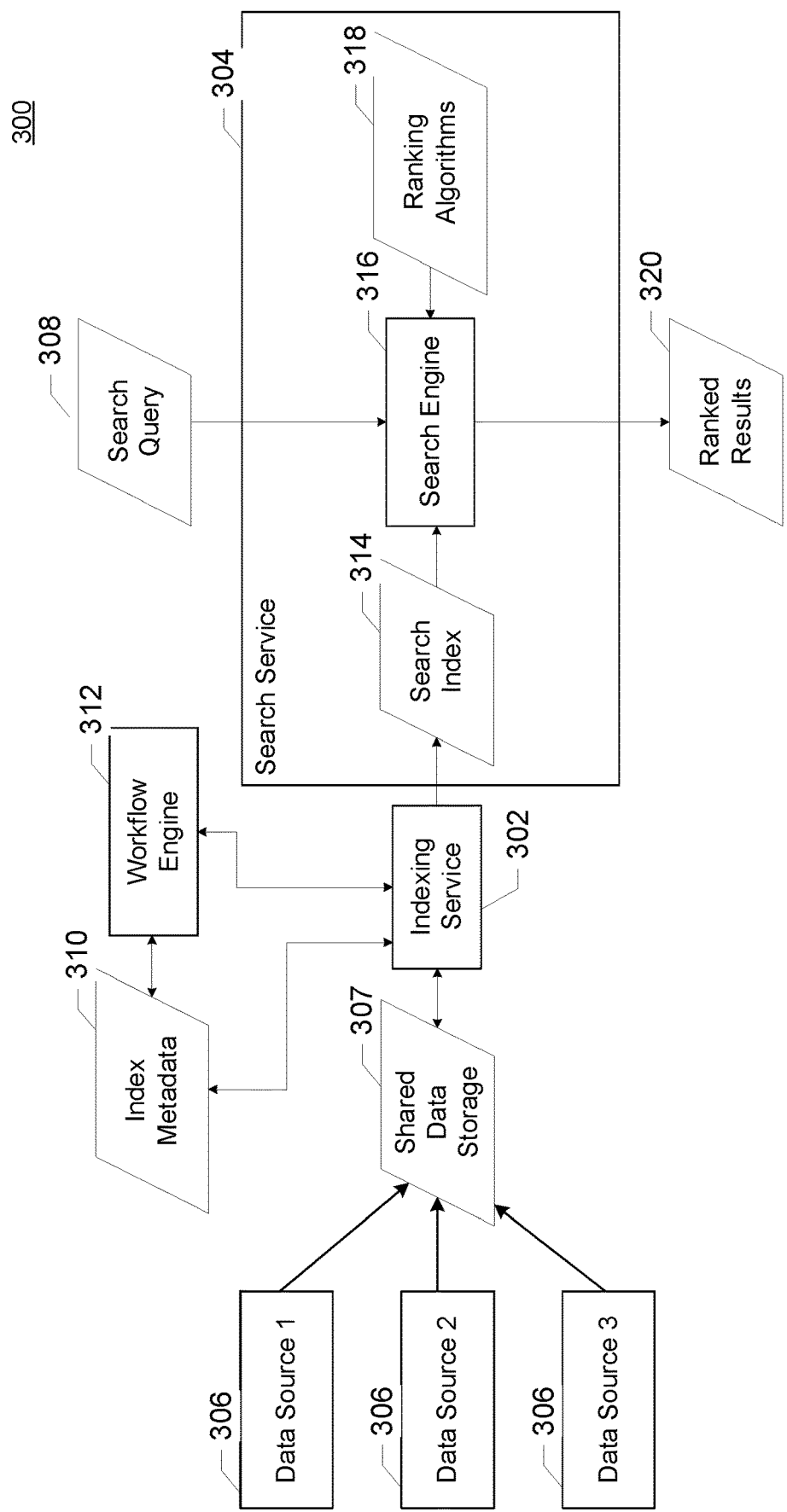
Figure 4:
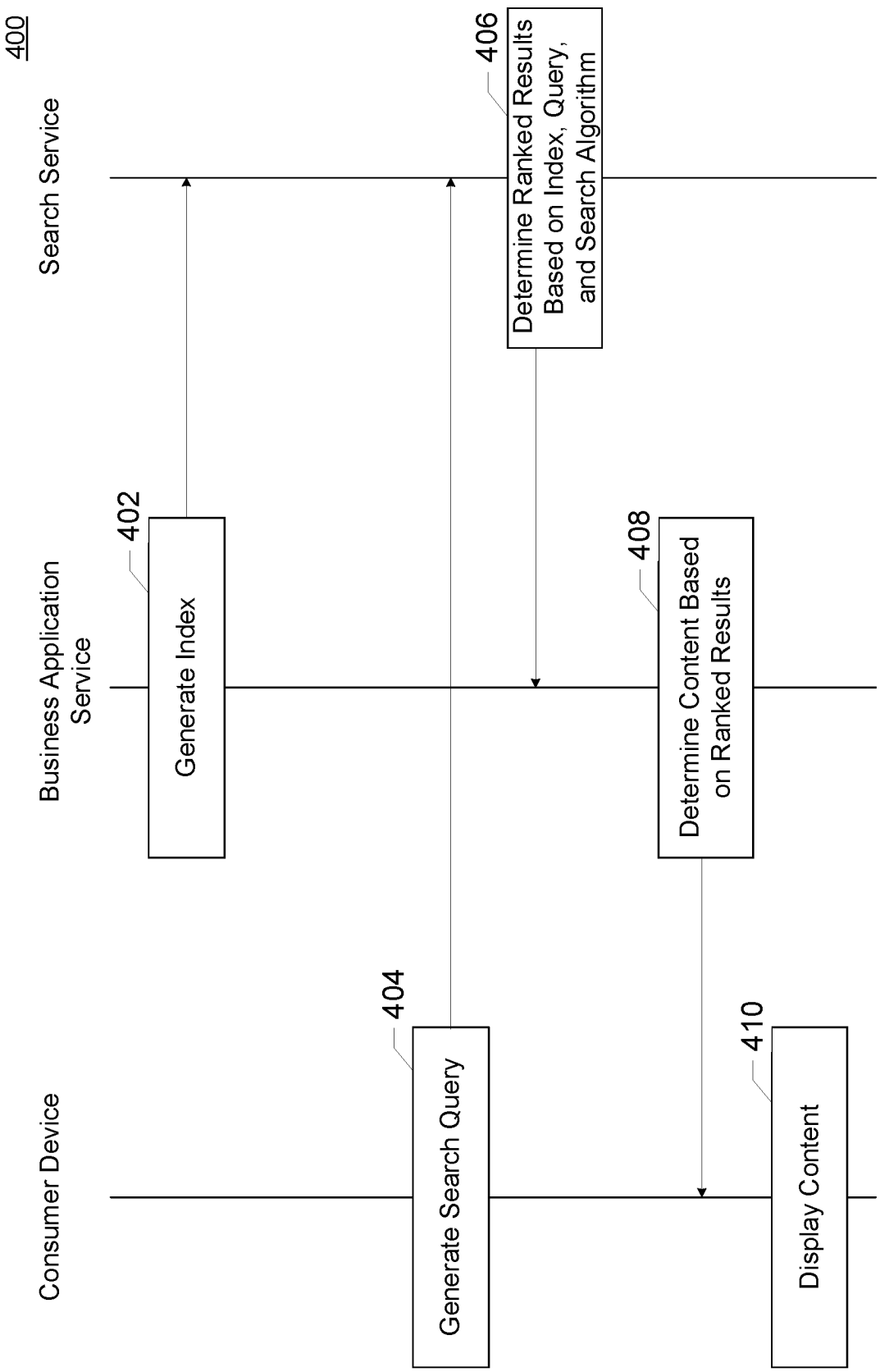
Figure 5:
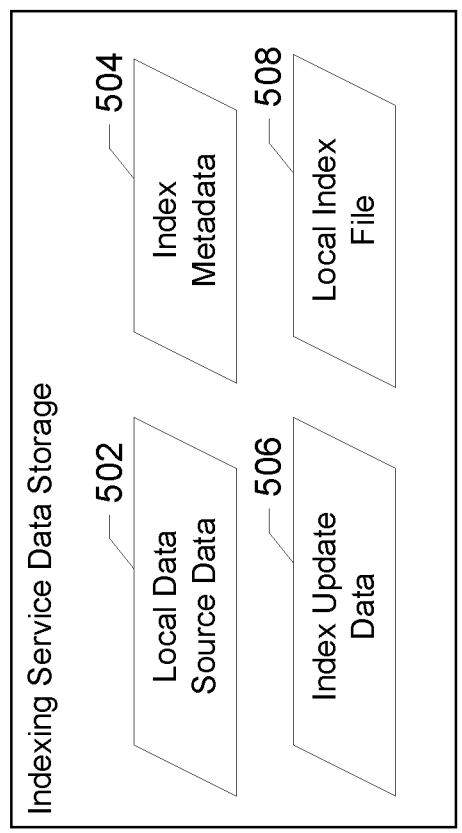
Figure 6:
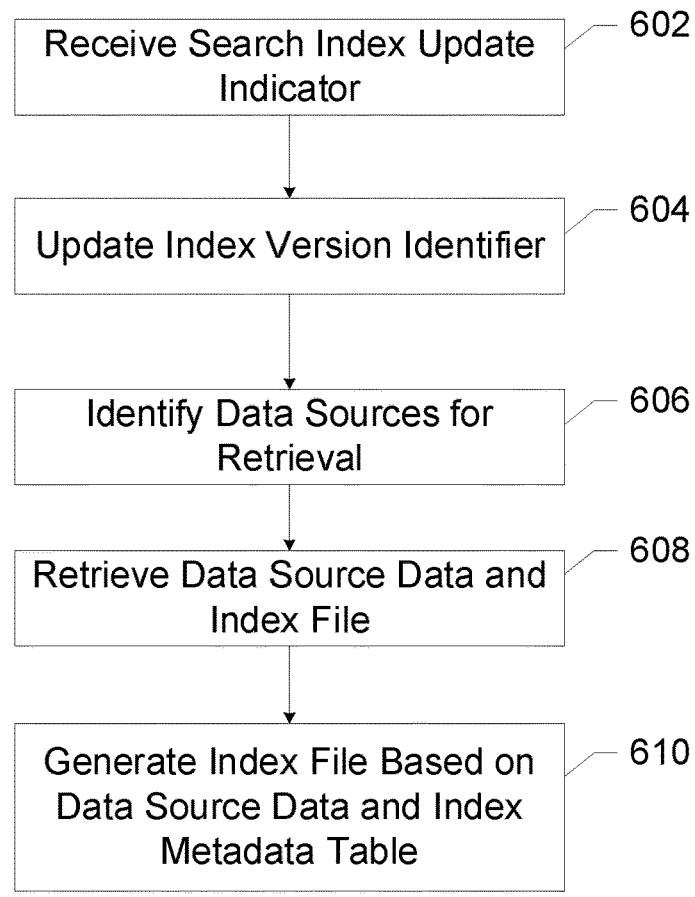
Figure 7:
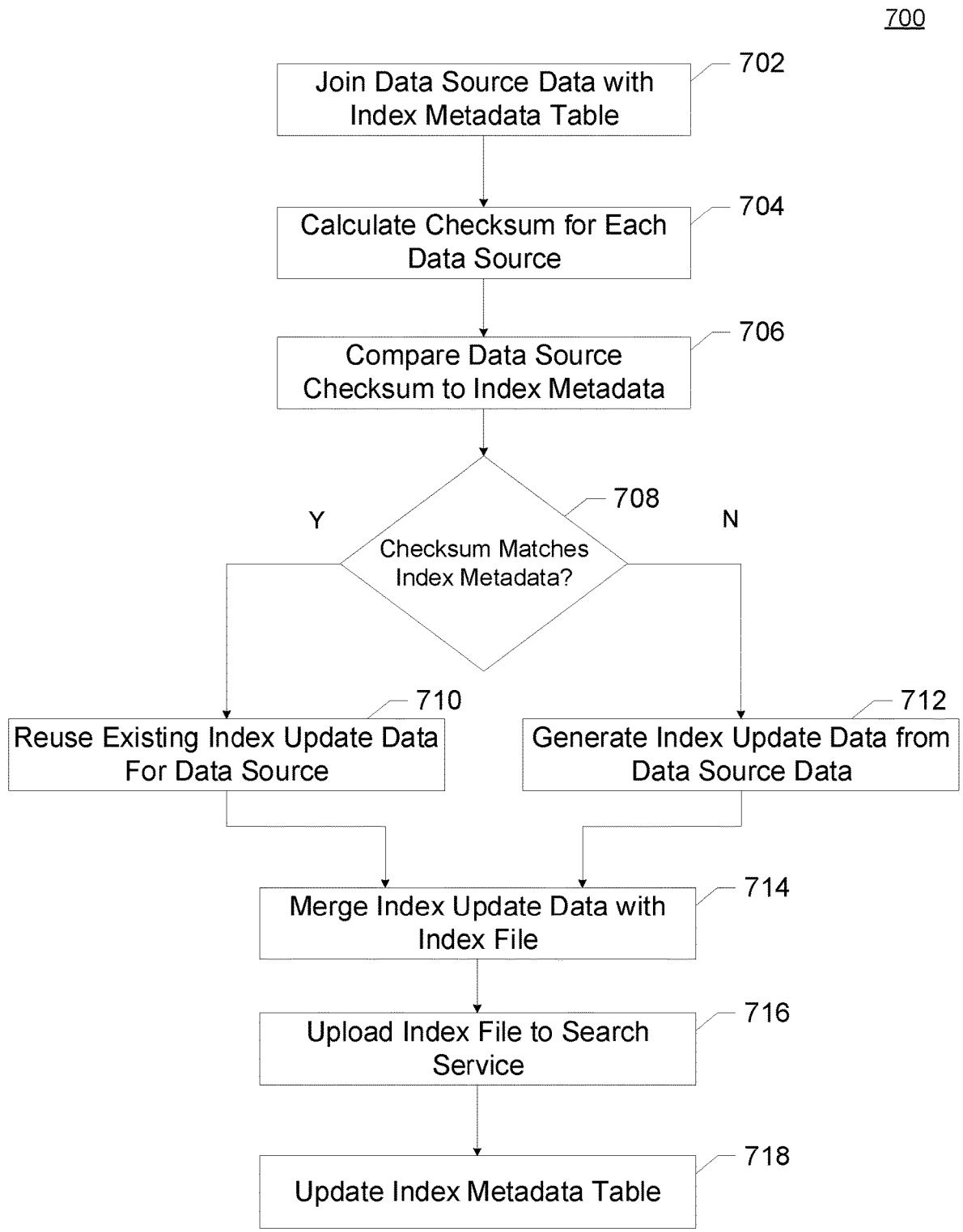

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example special-purpose device for implementing a search index generator in accordance with some example embodiments of the present invention;

FIG. 3 illustrates an example data flow between an indexing service and a search service in accordance with some example embodiments of the present invention;

FIG. 4 illustrates a signaling diagram describing interactions between a consumer device, a business application service, and a search service in accordance with some example embodiments of the present invention;

FIG. 5 illustrates a block diagram of data structures associated with a search indexer in accordance with some example embodiments of the present invention;

FIG. 6 illustrates a flowchart describing example computer-implemented processes for managing a search index generation workflow in accordance with some example embodiments of the present invention; and FIG. 7 illustrates a flowchart describing example computer-implemented processes for generating a search index in accordance with some example embodiments of the present invention.

DETAILED DESCRIPTION

Overview

Various embodiments of the present invention are directed to improved apparatuses, methods, and computer readable media for generating a search index. In this regard, embodiments of the present invention provide flexible, robust workflow for controlling when and how to generate a search index of one data received from one or more sources. Embodiments advantageously provide a modular system that allows for offline generation of a search index in a manner that provides for on-the-fly addition and removal of data sources from the index, reduction of duplicative tasks, and efficient consolidation of data from multiple data sources.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

Technical Underpinnings and Implementation of Exemplary Embodiments

As computer network technology has improved, reductions in latency and increases in bandwidth have made it more and more practical to offload intensive processing tasks from local machines to remote machines that are specially configured to perform such tasks. So-called "cloud" computing environments provide flexible, fault-tolerant platforms for performing tasks that may be too difficult or inefficient to perform locally. Previously, cloud computing environments were typically designed from the ground up for a particular purpose. However, some vendors have recognized that many users may benefit from using a cloud computing environment, even if budgets and expected uses do not warrant the expense of a special-purpose system. To take advantage of this need, these vendors have developed cloud-hosting services that lease scalable remote computing infrastructures to users. As an extension to this product offering, some of these vendors have developed suites of cloud services that are offered in conjunction with leased infrastructure. One service in particular that has been offered by certain vendors is in the area of search.

Vendors have recognized that, while many users may benefit from having the ability to offer their customers access to specially tailored search engines, those users may not have the knowhow, hardware, resources, or desire to implement such search engines on their own internal infrastructure. As such, search engine services are one type of service that is frequently offered by cloud computing vendors. Products such as Amazon.com, Inc.'s CloudSearch®, Apache Software Foundation's SOLR®, and ElasticSearch BV's ElasticSearch® provide scalable, cloud-based search solutions. Many of these services are capable of creating basic search indices automatically when provided a corpus of data. However, some of these services are also capable of receiving a search index or search index settings from users. Such custom search indices may offer improved searching of the user's data over more generic solutions. However, in cases where relationships between searchable items are dynamically changing and updating, or where data sources may be added or removed, maintaining a custom search index may be difficult and inefficient. For example, a promotion and marketing service may implement a system that dynamically measures customer interaction with the system and recommends promotions to customers based on those interactions (e.g., sales of promotions to customers with particular demographics, sales of promotions to customers with similar purchase histories, or sales of promotions to customers with similar location histories). A promotion and marketing service may also dynamically adjust the prominence of certain search results based on product inventory levels, promotion expiration timers, merchant available capacity, or the like. As such, a search solution that allows for dynamically changing search results based on some or all of these factors may require frequent updating of a search index to reflect changes in customer habits, the addition of new data, addition and expiration of promotions, and the like. To properly implement such a search, the index must be frequently regenerated to reflect changing associations between possible query criteria and the resulting content.

Furthermore, some users may wish to dynamically alter data sources used to generate the index. Users may wish to implement a new search criteria for matching a given query to a given content set. For example, a user may wish to run an experiment to see if adding an association between a particular consumer characteristic and a particular content type improves the click-through rate or purchase rate of content provided by the search results. In order to generate an index taking into account such a new data source, the entire index must be regenerated, even including data that was already reflected in the index.

Recognizing these problems, and through applied effort and ingenuity, the inventors have developed a robust, scalable system and workflow for generating a search index that allows for on-the-fly addition and deletion of data sources without a need to regenerate the entire search index each time. The inventors have also identified improved methods, systems, and devices for generating, storing, maintaining, and managing search indices which are reflected in the embodiments described herein. In particular, embodiments act to improve the functioning of search engines by reducing the system resources devoted to generating search indices and providing improved search results by streamlining the process by which data sources are integrated with the search engine.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example networked computing system within which embodiments of the present invention may operate. A business application service 102 may communicate with a search service 104 and a consumer device 110 via a network 108. The business application service 102 may further generate a search index 106 that is used by the search service 104 to manage one or more search queries. Such search queries may be provided by the consumer device 110.

The business application service 102 may be embodied as one or more servers which are a computer or computers as known in the art. The business application service 102 may provide for receiving of electronic data from various sources, including but not necessarily limited to the search service 104 and the consumer device 110. For example, the business application service 102 may be a promotion and marketing service operable to provide an e-commerce interface for offering the sale of one or more promotions, goods, or the like to consumers. The business application service 102 may utilize the search service 104 to manage search queries related to content offered by the business application service 102. It should be appreciated that such search queries may be received from consumer devices (e.g., where the consumer device enters a search query in a field of a form on the e-commerce interface) or from other sources. For example, the business application service 102 may dynamically generate search queries that are used to provide content to consumers (e.g., a search query requesting promotions of a certain type, promotions with an expiration date, or recently popular promotions) via the e-commerce interface. To identify associations between particular search terms or criteria and particular content (e.g., promotions), embodiments may generate the search index 106 which is provided to the search service 104. The search service 104 may then use the search index 106 along with any received search queries to return a set of content to the business application service 102 that is responsive to the received search queries.

The business application service 102 may access a data storage device such as a Network Attached Storage (NAS) device or devices, or as a separate database server or servers to store data, such as the search index 108. Such data may include any information accessed and stored by the business application service 102 to facilitate the operations of the business application service 102. For example, the database may include, without limitation, user account credentials for system administrators, merchants, and consumers, data indicating the products and promotions offered by the business application service, electronic marketing information, analytics, reports, financial data, the search index 108, and/or the like.

The consumer device 110 may be any computing device as known in the art and operated by a consumer. Electronic data received by the business application service 102 from the consumer device 110 may be provided in various forms and via various methods. For example, the consumer device 110 may be a desktop computer, laptop computer, smartphone, netbook, tablet computer, wearable, or the like.

In embodiments where a consumer device 110 is a mobile device, such as a smart phone or tablet, the consumer device 110 may execute an "app" to interact with the business application service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The business application service 102 may leverage the application framework offered by the mobile operating system to allow consumers to designate which information is provided to the app and which may then be provided to the business application service 102. In some embodiments, consumers may "opt in" to provide particular data to the business application service 102 in exchange for a benefit, such as improved relevancy of marketing communications offered to the user. In some embodiments, the consumer may be provided with privacy information and other terms and conditions related to the information provided to the business application service 102 during installation or use of the app. Once the consumer provides access to a particular feature of the mobile device, information derived from that feature may be provided to the business application service 102 to improve the quality of the consumer's interactions with the business application service.

For example, the consumer may indicate that they wish to provide location information to the app from location services circuitry included in their mobile device. Providing this information to the business application service 102 may enable the business application service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the business application service 102. For example, the consumer may decide at a later point to disable the ability of the app to access the location services circuitry, thus limiting the access of the consumer's location information to the business application service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the business application service through leveraging the functionality offered by the various mobile operating systems.

Additionally or alternatively, the consumer device 110 may interact through the business application service 102 via a web browser. As yet another example, the consumer device 110 may include various hardware or firmware designed to interface with the business application service 102 (e.g., where the consumer device 110 is a purpose-built device offered for the primary purpose of communicating with the business application service 102, such as a store kiosk).

An example of a data flow for exchanging electronic information among a business application service, a consumer device, and a search service is described below with respect to FIG. 3. An example signal diagram depicting interactions among a business application service, a consumer device, and a search service is described further below with respect to FIG. 4.

Example Apparatuses for Implementing Embodiments of the Present Invention

The business application service 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, index workflow circuitry 210, and index generation circuitry 212. The apparatus 200 may be configured to execute the operations described above with respect to FIG. 1 and below with respect to FIGS. 3-7. Although these components 202-212 are described with respect to functional limitations, it should be understood that the particular implementations necessarily include the use of particular hardware. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The index workflow circuitry 210 includes hardware configured to manage access to and receipt of data from one or more data sources, manage a workflow for generating and updating a search index, and manage providing the search index to a search service. The index workflow circuitry 210 may be configured to retrieve data from one or more data sources located either remotely or locally to a business application service. Such data may be received from a memory, such as the memory 204, and/or via communications circuitry, such as the communications circuitry 208. The index workflow circuitry 210 may also be configured to determine whether and when to update a search index. For example, the index workflow circuitry 210 may detect when data received from the data sources has been updated, or that a particular criteria has occurred (e.g., a time interval since last update, a new data source has been added, or a data source has been deleted). In some embodiments, the index workflow circuitry 210 may include hardware configured to identify particular data sources for retrieval of information to be used in generation of a search index. Identification of data sources for data retrieval may be performed by, for example, reading a configuration file or in response to receiving a communication from a data source (e.g., via a network data packet or via an application programming interface (API) function call). The index workflow circuitry 210 may perform these tasks through the use of processing circuitry, such as the processor 202, a memory, such as the memory 204, and communications circuitry, such as the communications circuitry 208. However, it should also be appreciated that, in some embodiments, the promotion management circuitry 210 may include a separate processor, memory, and the like, a specially configured field programmable gate array (FPGA), or an application specific interface circuit (ASIC) to manage a search index generation workflow in accordance with exemplary embodiments. The index workflow circuitry 210 is therefore implemented using hardware components of the apparatus 200 configured by either hardware or software for implementing these planned functions.

The index generation circuitry 212 includes hardware configured to process data received from the one or more data sources and to generate a search index to be used by a search service for providing results related to content associated with the data sources. The index generation circuitry 212 is configured to merge one or more sets of input data into a search index that may be used by a search service as described above. For example, the input data may include one or more sets of formatted data, such as data formatted as a set of Comma Separated Values (CSV), data formatted in Extensible Markup Language (XML), or the like. In some embodiments, the index generation circuitry 212 is aware of the particular format of various data sets received from particular data sources. For example, data sources may provide data for indexing by invoking an API, and the API may be employed to both provide the data and notify the index generation circuitry 212 of the fields of the data, the format of the data, data types of the data, or the like.

In some embodiments, the index generation circuitry 212 generates the search index by first executing a join query that joins all tables received from each data source for all data sources (e.g., temporary copies of the tables from the data sources stored locally to the index generation circuitry 212) as well as a metadata table for the index (e.g., to compare checksums to exclude unchanged data from a previous version). An example of a query joining a set of such tables might be implemented as:

TABLE 1

SELECT d.*, m.deal_id as meta_deal_id from deal d left outer join s1 on d.deal_id = s1.dea_id left outer join s2 on d.deal_id = s2.deal_id ... left outer join sN on d.deal_id=sN.deal_id left outer join m on d.deal_id = m.deal_id where (meta_deal_id is null) OR (checksum(s1, s2...sN) <> m.checksum AND d.last_updated > m.last_updated)

In the present example, such a query may be performed as a MapReduce job that is executed concurrently in a distributed system.

As a second step of generating the search index by the index generation circuitry 212, embodiments may write a result of the above query into a format that is suitable for consumption by a search service. For example, the query result may be used to create a new iteration of the index and a new file may be created in a JavaScript Object Notation format.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Search Index Generation Data Flow

FIG. 3 depicts an example data flow 300 illustrating interactions between an indexing service 302, a search service 304, a workflow engine 312, and one or more data sources 306 in accordance with some embodiments of the present invention. In some embodiments, the indexing service 302 and the workflow engine 312 may be implemented on a single computing device, such as the apparatus 200 described above with respect to FIG. 2. Although example embodiments as provided herein may generally be described with the indexing service 302 implemented on a local node and the search service 304 implemented on a remote node, it should be understood that other implementations may also be possible, such as with both the indexing service 302 and the search service 304 on a remote node, or with the indexing service 302 and the search service 304 on two different remote nodes.

The indexing service 302 receives data from one or more data sources 306. The indexing service 302 may be implemented via special-purpose circuitry such as described above with respect to the index generation circuitry 212. The data sources 306 may be any source of data that is used in generation of a search index. In some embodiments, data sources 306 may be implemented remotely from the indexing service. For example, data sources 306 may be implemented on other nodes or at remote data centers. Data sources 306 may communicate with the indexing service 302 in a variety of manners. Typically, a worker process associated with each data source on the data source's local network may copy data from the local data source to a shared data storage 307 accessible to both the indexing service 302 and the data sources 306. The shared data storage 307 may be implemented as any storage accessible to both the data sources 306 and the indexing service 302, though in some exemplary embodiments the shared data storage 307 is a cloud storage system such as Amazon Inc.'s Simple Storage Service. Such an implementation eliminates the need for the indexing service 302 to have access to a private network associated with each data source, thus improving accessibility to the data.

Alternatively, some embodiments may transmit data directly to the indexing service. For example, in some embodiments the data sources 306 may provide data to the indexing service 302 via an API. The API may provide a set of functions for interfacing with the search indexing process. For example, a new data source may register for inclusion in the search indexing process by notifying the indexing service 302 via an API function call, and then send data to be indexed via another API call. Alternatively, once the data source is registered with the indexing service 302, the data source may be accessed by the indexing service 302 the next time the indexing service 302 generates or updates a search index.

Some embodiments may support retrieval of a particular set of data from a shared data source 307 by the indexing service 302. For example, embodiments may include the ability to retrieve data records added or modified after a particular date, time, or timestamp. In order to communicate with various data sources, embodiments may implement interfaces on said data sources. For example, particular data sources may execute local routines, APIs, management applications, or the like that allow the indexing service 302 to request and retrieve data from the data sources. These local interfaces may further perform registration with the indexing service 302, and upon registration the data source may be accessible to the indexing service 302.

The data sources 306 may be any type of data source operable to provide data that may be useful for inclusion in a search index. Different applications may include different data sources. For example, in the context of a promotion and marketing service, the data sources 306 may include relevance data identifying links between particular consumers and particular promotions, data related to past promotion purchases for consumers, data linking locations to particular promotions, data linking particularly successful marketing campaigns to particular promotions, data identifying links between promotions and particular types of categories, or any other sort of links between consumers, demographic data, products or services, promotions, and the like. Data sources may provide data in a variety of different formats as well. For example, some data sources may be implemented via a Representational State Transfer (REST) API, some data sources may be provided as raw tables (e.g., SQL tables), and some data sources may be provided in other formats (e.g., Apache HIVE).

Data sources 306 may provide data in a native format that is converted into data that is usable in the search indexing process. It should be appreciated that receiving data from these data sources 306 may include conversion of received data into a data source agnostic format suitable for search indexing.

The indexing process may be managed by a workflow engine 312. The workflow engine 312 may interact with a set of index metadata 310 to determine whether, when, and how to retrieve data from the data sources 306 and create or update a search index. The workflow engine 312 may be implemented via index workflow circuitry 210 as described above with respect to FIG. 2. The workflow engine 312 may use the index metadata 310 to perform version control of the search index and to reduce the chance of duplicative processing when generating the search index. For example, the workflow engine 312 may increment a version counter stored in the index metadata for a particular search index every time that search index is updated. The index metadata 310 may also include checksum data for particular data sources so that the workflow engine 312 and/or indexing service 302 may determine whether a particular data source has had any changed data. The workflow engine 312 may also manage registration and deletion of data sources to determine whether a given data source is included in a given indexing operation. It should be appreciated that while the data flow is described with respect to a single search index, the workflow engine 312 and/or indexing service 302 may be employed to manage, create, and update multiple search indices reflecting different data sources. It should also be appreciated that, while the instant diagram and previous discussion of the workflow engine 312 and the indexing service 302 describes these services as two separate components and/or entities, embodiments may include a single component, module, or entity that performs the functionality of both.

The indexing service 302 may use the data provided by the data sources to generate a search index 314. The search index 314 may be provided to the search service 304 for use in a search operation. The search index 314 may first be generated locally to the indexing service 302 and then transmitted to the search service 304 for use in search operations. To make updates to the search index 314, the indexing service 302 may obtain a copy of the search index 314 from the search service 304, update the search index 314 locally, and then transmit the search index 314 back to the search service 304.

The search index 314 may be implemented in a variety of formats suitable for linking possible search results with possible search queries. In some embodiments, the search index 314 is implemented in JavaScript® Object Notation (JSON) as a set of value pairs linking particular search terms with particular promotion identifiers, promotion category identifiers, brand names, or any other type of content that may be returned by a search on a matching query.

The following examples illustrate the conversion process from data source data into a search index. A category and taxonomy service may return a set of promotion categories as a JSON document. Such promotion category data may be formatted as follows:

TABLE 2

```
[{      "guid":"aa8f7b34-7126-4edd-918b-9d8541fe8d83",
        "description":"Merchant Service",
        "name":"Merchant Service",
        "root_categories":[
              "864efa12-f002-4754-ac4c-c05c41795f35",
              "5bc358b8-edab-45aa-8f5c-da04eee76e57",
              "61c3b5f2-9bd8-4943-be9a-590ec10e2438",
              "44ed544c-6707-4a19-ad3c-1bdf71158b03",
              "a2987175-6497-448b-ba7f-f1aecf7d8fb8",
              ...
        ]
},
{
"guid":...
},...]
```

Merchant information may be retrieved from a data cluster (e.g., HIVE) as tabular data:

TABLE 3

"id":,"name","permalink","website","salesforce_account_id",...
--------------------------------------------------
"00001860-aed7-11e1-8e54-00259060b612","Skylink Aviation","skylink-aviation","http://skylink.homestead.com/","001C000000xEqrLIAS",...
"00002dbb-1076-976d-69a0-1bb4686898d0","CINDERELLA TRAINERS(シンデレラトレーナーズ)","cinderella-trainers","http://www.cinderellatrainers.com/index.html","001C000001Fk LuMIAV",...

Embodiments may use input data such as from Tables 2 and 3 above and generate a search index file. For example, such an index file including data derived from promotion information may read as follows:

TABLE 4

```
[
{"type": "add",
"id": "deal-id-12345",
"fields": {
"name": "Awesome deal #1",
"description": "Playstation 4 for sale",
"merchant_name": "SONY",
"brand_names": ["Playstation 4", "Playstation", "PS4"]
"categories": ["Goods","Merchant service","Game console"
"Playstation 4"]
...
}
},
{"type": "delete",
"id": "deal-id-54321"
}
,...
]
```

It should be appreciated that different search services may require indices formatted in different manners, and the above example is not intended to be limiting. The indexing service 302 may be aware of the particular format required for the particular search service 304 being used and create the index accordingly.

The search service 304 is operable to receive search queries and to provide results responsive to those search queries. Providing responsive results may also include ranking the search results. To this end, the search service 304 may receive a search query 308. The search query 308 may be received from a variety of sources. For example, in some embodiments search queries may be submitted directly to the search service from consumers. In other embodiments, the search queries may be received from a consumer by a business application service and then transmitted to the search service by the business application service for processing. In yet further embodiments, the search query 308 may be generated internally to the business application service, rather than by a consumer. The search query 308 may include one or more text strings or other data. For example, the search query 308 may include a set of characteristics of a particular consumer, such as demographic information, past purchases by the particular consumer, or the like.

A search engine 316 performs a mapping between the search query 308 and a set of results using the search index 314. The search engine 316 may also employ a set of ranking algorithms 318 to rank results where the query has mapped to items indexed in the search index 314. A set of ranked results 320 may be output as a result of this mapping and application of the ranking algorithms. The ranked results 320 may be provided to a consumer who initiated the query, or the ranked results 320 may be provided to a business application service or other application for use in providing relevant results to the consumer. In cases where the search query is generated by an application such as the business application service, the application may utilize the ranked results to generate content for a website or other electronic marketing communication.

Example Interactions Among a Consumer Device, Indexing Service, and Search Service FIG. 4 illustrates an example signaling diagram showing interaction among a consumer device, a business application service including an indexing service, and a search service in accordance with some example embodiments. As described above with respect to FIG. 3, a business application service may include an indexing service for generating a search index that is utilized by a search service to respond to search queries. The signal diagram 400 illustrates one possible flow to do so.

At action 402, an indexing service, such as the indexing service 302 described above, generates a search index and provides the search index to a search service. Generation of the search index may be performed according to a process managed by a workflow engine. For example, as described above, a workflow engine may generate or update a search index in response to detecting a new data source, in response to determining that a predefined period of time has elapsed, or the like. Generation of the search index may be performed by a process as described above with respect to FIG. 2 and described further below with respect to FIGS. 5-7.

At action 404, a consumer device generates a search query and transmits the search query to the search service. The search service determines a set of ranked results responsive to the query according to the search index, terms contained in the query, and any search ranking algorithms. The results may be provided to the business application service, and at action 406 the business application service may determine a set of content associated with the ranked results. For example, the ranked results may be associated with particular promotions that were responsive to the search query. At action 408, the content associated with the ranked results is provided to the consumer device, such as content of a web page, e-mail, or the like.

Example Local Data Storage for an Indexing Service

FIG. 5 illustrates an exemplary local data storage 500 for storing data accessible to an indexing service during an indexing operation. In particular, the local data storage 500 includes a set of data structures for facilitating the indexing operation, including management of updated data source data, index metadata, and generation and transmission of a completed search index. The local data storage 500 includes local data source data 502, index metadata 504, index update data 506, and a local index file 508. The local data source data 502 includes data received from one or more data sources and stored locally to the indexing service. The local data source data 502 may include a direct copy of data stored in one or more of the data sources, or the local data source data 502 may include data specially formatted by the data source for use during the indexing process. The local data source data 502 may be processed by the indexing service to generate a set of index update data 506.

To determine whether to generate and/or merge a set of index update data 506, embodiments may interact with a set of index metadata 504. The index metadata 504 may provide data to a workflow component (e.g., the workflow engine 312 described above with respect to FIG. 3) to determine whether a particular data source should be included in or replaced within a given search index. Determining whether to update a given index may include joining a set of local data source data 502 with the index metadata 504. The join operation may include calculation of a checksum for each data source entity. If the checksum for a given data source matches the checksum stored in the index metadata 504, then the match indicates there is no need to index that data source again, as the matching checksum indicates the data has not changed.

Upon comparing the index metadata 504 to the set of local data source data 502, a set of index update data 506 may be generated reflecting any data sources that need to be added to the index as a result of the comparison to the index metadata 504. Generation of the index update data 506 may be performed as a mapreduce process to merge the index update data 506 into the local index file 508. In some embodiments, this process of merging the index update data 506 into the local index file 508 is split into multiple parallel processing steps by creating a plurality of data shards from the index update data. Each shard may then be merged into the search index concurrently.

Shard strategies may be chosen at the time the index is prepared. Different entities may have different sharding strategies depending upon the entity to be searched. For example, if the data source is a search of promotions, the data may be sharded based on promotion characteristics such as the country of the promotion location, the first letter of the promotion name, or a promotion identifier mod a number of shards, approaches that split data evenly into shards such as splitting by promotion hash identifiers and mod by a number of shards, or splitting hashed identifiers into consecutive ranges. Typically, as long as the data from a data source is divided using the same strategy during each iteration, data related to a shard will always be processed by the same node.

A locally stored copy of the index maintained as a local index file 508 may be updated with the index update data 506 to create an updated index that is then uploaded to a search service for use in processing search queries.

Exemplary Methods for Generating a Search Index

As described above, exemplary embodiments of the present invention are directed to methods and systems for generating a search index. FIGS. 6-7 illustrate particular methods that may be employed by embodiments of the present invention to manage a search index workflow and to generate a search index as part of a search index workflow in accordance with embodiments of the present invention.

FIG. 6 illustrates a flowchart describing exemplary computer-implemented processes 600 for managing a search index generation workflow in accordance with some example embodiments of the present invention. As described above, embodiments of the present invention advantageously provide an improved workflow for generating a search index from multiple disparate data sources in a manner that reduces duplication of processing effort. The process 600 illustrates one such exemplary workflow. The process 600 may be performed, for example, by index workflow circuitry 210 described above with respect to FIG. 2 or by a workflow engine 312 described above with respect to FIG. 3.

At action 602, the process 600 receives a search index update indicator. The search index update indicator may take the form of a variety of different signals. In some embodiments, the search index update indicator may be received after a particular period of time has elapsed since a search index was previously generated or updated. In some embodiments, the search index update indicator may be received in response to a new data source being registered with or deleted from a set of data sources to be indexed by the search indexer.

At action 604, the process updates an index version identifier, such as may be contained in a set of index metadata. Updating the index version identifier may be performed to indicate that a new version of the search index has been created. In some embodiments, the index version identifier also includes a timestamp indicating the time at which the index was created.

At action 606, one or more data sources are identified for retrieval. Identification of the data sources may be performed by examining a configuration file or other file identifying the data sources. In some embodiments, data sources may be added to the file in response to a registration request being received from the data source, such as by a registration API call.

At action 608, data associated with the data sources is retrieved and, if available, a latest version of an index file being used by a search service is retrieved. Retrieval of data from the data sources may include formatting data from the data sources into a data-source-agnostic format such as JSON. The data source data may indicate links between particular query terms and particular content, which, when formatted, may be represented as a set of pairwise values.

At action 610, an index file is generated using the retrieved data, any retrieved index file, and the index metadata. An example process for generating the index file is described further below with respect to FIG. 7.

FIG. 7 illustrates a flowchart describing example computer-implemented processes for generating a search index in accordance with some example embodiments of the present invention. An example process 700 is provided for determining whether data associated with particular data sources should be updated and then adding said data to a search index. The process 700 may be performed by index generation circuitry 212 as described above with respect to FIG. 2, or an indexing service 302 as described above with respect to FIG. 3.

At action 702, the method 700 begins by joining a set of data source data to an index metadata. At action 704, a checksum is calculated for each data source in the joined data source data. The checksum for each data source is compared to a checksum included in the index metadata at action 706 to determine whether the data source includes any changes that need to be reflected in the search index. At action 708, if the checksum matches the index metadata, the method proceeds to action 710. Otherwise, the method proceeds to action 712.

At action 710, if the checksums match, existing data for the data source is reused. Otherwise, at action 712, new index update data is generated from the associated data source data. At action 714, any existing search index is merged with the index update data. At action 716, the updated search index is uploaded to a search service, and at action 718, the index metadata table is updated reflecting the newly updated index.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for updating a search index, the method comprising:
   receiving, by a processor, a search index update indicator, the search index update indicator generated in response to a data source being registered to or deleted from a set of data sources associated with the search index;
   calculating, by the processor, a checksum for each data set of the set of the data sources;
   comparing, by the processor, the checksum for each data set of the set of data sources to search index metadata;
   in response to determining that a selected checksum for a selected data set of the set of data sources does not match the search index metadata, generating new index update data;
   merging the new index update data with the search index to create an updated search index; and
   transmitting, by the processor, the updated search index to a service for use in responding to at least one search query.

2. The method of claim 1, wherein the search index update indicator is a periodic indicator.

3. The method of claim 1, wherein the new index update data is generated by a MapReduce process.

4. The method of claim 1, wherein the merging the new index update data with the search index comprises splitting the new index update data into multiple shards.

5. The method of claim 4, wherein each of the multiple shards is merged concurrently into the search index.

6. The method of claim 5, wherein each of the multiple shards is processed as a separate MapReduce process.

7. The method of claim 4, wherein the index update data is split into multiple shards based on promotion location.

8. An apparatus for updating a search index, the apparatus comprising one or more processors and one or more memories for storing instructions that, with the one or more processors cause the apparatus to:
   receive a search index update indicator, the search index update indicator generated in response to a data source being registered to or deleted from a set of data sources associated with the search index;
   calculate a checksum for each data set of the set of the data sources;
   compare the checksum for each data set of the set of data sources to search index metadata;
   in response to determining that a selected checksum for a selected data set of the set of data sources does not match the search index metadata, generate new index update data;
   merge the new index update data with the search index to create an updated search index; and
   transmit the updated search index to a service for use in responding to at least one search query.

9. The apparatus of claim 8, wherein the search index update indicator is a periodic indicator.

10. The apparatus of claim 8, wherein the new index update data is generated by a MapReduce process.

11. The apparatus of claim 8, wherein the merging the new index update data with the search index comprises splitting the new index update data into multiple shards.

12. The apparatus of claim 11, wherein each of the multiple shards is merged concurrently into the search index.

13. The apparatus of claim 12, wherein each of the multiple shards is processed as a separate MapReduce process.

14. The apparatus of claim 11, wherein the index update data is split into multiple shards based on promotion location.

15. A non-transitory computer readable storage medium for updating a search index, the non-transitory computer readable storage medium comprising instructions that, when executed by a processor, configure an apparatus to:
   receive a search index update indicator, the search index update indicator generated in response to a data source being registered to or deleted from a set of data sources associated with the search index;
   calculate a checksum for each data set of the set of the data sources;

compare the checksum for each data set of the set of data sources to search index metadata;

in response to determining that a selected checksum for a selected data set of the set of data sources does not match the search index metadata, generate new index update data;

merge the new index update data with the search index to create an updated search index; and transmit the updated search index to a service for use in responding to at least one search query.

16. The non-transitory computer readable storage medium of claim 15, wherein the search index update indicator is a periodic indicator.

17. The non-transitory computer readable storage medium of claim 15, wherein the new index update data is generated by a MapReduce process.

18. The non-transitory computer readable storage medium of claim 15, wherein the merging the new index update data with the search index comprises splitting the new index update data into multiple shards.

19. The non-transitory computer readable storage medium of claim 18, wherein each of the multiple shards is merged concurrently into the search index.

20. The non-transitory computer readable storage medium of claim 18, wherein each of the multiple shards is processed as a separate MapReduce process.

* * * * *